Patented July 18, 1939

2,166,681

UNITED STATES PATENT OFFICE 2,166,681

DIAZOAMINO COMPOUNDS

Hans Eduard Fierz-David and Willy Gerhard Stoll, Zurich, Switzerland, assignors to Compagnie Nationale de Matieres Colorantes et Manufactures de Produits Chimiques du Nord Reunies, Etablissements Kuhlmann, Paris, France, a corporation of France No Drawing. Application November 18, 1937, Serial No. 175,341. In Germany December 5, 1936

6 Claims. (Cl. 260—140)

This invention relates to water soluble aromatic derivatives of arsonic acid.

In the Journ. of the Amer. Chem. Soc. 43, p. 1632 (1921) Heidelberger and Jacobs have disclosed a process whereby diazonium salts from amino-aryl-arsonic acids may be treated with certain primary or secondary amines in absence of mineral acid, to produce diazo-amino compounds. Those diazo-amino compounds possess the disadvantage of being insoluble or only slightly soluble in cold water, and of being of a very little stability. Besides those weak points, those compounds possess no remarkable therapeutic actions, even, in many cases, their properties do not allow their use as therepeutics.

It has been found, according to the present invention, that products which possess very interesting properties can be obtained if care is taken that the coupling compound which does not contain the arsonic acid possesses at least one sulfonic group.

Not only the solubility of the new products is greatly increased, but also their stability. The obtained diazo-amino compounds are yellow crystals; they can easily be obtained chemically pure. They are very stable in dry state as well as in neutral or alkaline solution, and they are readily soluble even in cold water. The aqueous solutions are neutral on litmus paper. Mineral organic or inorganic acids split the diazo-amino compounds readily in diazotized amino-phenylarsonic acid and in the aromatic amine which has been used for stabilization. By injection into warm blooded animal-bodies or by oral administration of the neutral or slightly alkaline solutions of the diazoamino compound, an arsanil-azo-protein is obtained in the body. The treated animals do not show any poisoning signs neither any irritation.

Those diazoamino compounds may be used for the preparation of arsonic containing colours. A mixture of the diazo-amino compound with one of the coupling components which are used in the azo-dyes (ice color) industry in solution or in solid state, does not show any reaction, but when acidified and heated its solution with acetic acid gives the correspondent arsonic containing azo dye.

It is possible for instance to put the diazonium salts of the aminoarylarsonic acids into reaction with aromatic amines of the formula

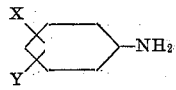

in which X is a member of the group consisting of COOH, SO₃H, SO₂H and Y a member of the group consisting of COOH, SO₃H, SO₂H, Hal, alcoyl, aryl, alcoxy and aryloxy, at least one of the two substituents being a sulfonic group, in a solution which can be of acetic acidity until neutral.

The same products can be obtained by reacting diazonium salts of the following formula:

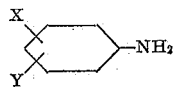

with amino-arylarsonic acids. It is also possible to put into reaction diazotized amino-arylarsonic acids in presence of mineral acid binding compounds with secondary aliphatic or mixed aliphatic-aromatic amines of the following formula:

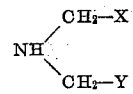

X being a member of the group consisting of H, COOH, SO₃H, halogen, alcoyl, aralcoyl, aryle, hydroaryl, and Y being a member of the group consisting of COOH, SO₃H, alcoyl, aralcoyl, aryl, hydroaryl, providing that at least one of the two substituents represents a sulfonic group.

The new compounds hereby described are susceptible to find their application as biological and pharmaceutical products.

Some examples of carrying out the invention are described hereafter.

Example 1

5.86 gr. of sodium salt of p-amino-phenyl-arsonic acid are dissolved in 500 ccm. normal HCl. The temperature of the solution being kept at 0° C. there is added to the solution, by small amounts and under stirring, 20 ccm. of a normal sodium nitrite solution. The diazonium solution thus obtained is poured slowly, round 5° C., in a neutral solution of 4.52 gr. of 6-amino-3-sulfobenzoic acid in 50 ccm. water to which has been added previously 7 gr. of crystallized sodium acetate. The mixture is stirred during 2 hours and then is added dilute sodium carbonate solution until the solution is neutral against litmus paper. After one half hour the solution is heated up to 50° C. and there is added NaCl to obtain a 20% solution. By cooling to 0° C., the sodium salt of the 2-carboxy-4-sulfo-diazo-amino-benzene-4'-arsonic acid precipitates in small crystals, which are filtrated washed with a saturated NaCl solution and dried under vacuum at 50–60° C. The equation is as follows:

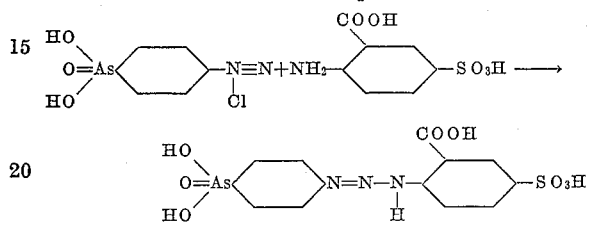

The product thus obtained is pure enough for any application, the only impurity which it may contain being traces of sodium chloride. If the product is wanted pure for an analyse it can be crystallized from water.

The same product is obtained when diazotised 6-amino-3-sulfobenzoic acid is condensed with p-amino-phenylarsonic acid, to a diazo-amino-compound.

*Example 2*

2.17 gr. of m-amino-phenyl-arsonic acid are dissolved in 30 ccm. water, and after an addition of 15 ccm. hydrochloric acid the solution is diazotized at 0° C. with 10 ccm. of a N-sodium nitrite solution. The obtained solution is then poured at 6° C. in a neutral solution of 2.2 gr. of 4-sulfo-2-amino-benzoic acid, to which has been previously added 2 gr. of sodium acetate. After 2 hours stirring the solution is neutralized by addition of dilute sodium carbonate solution, and the diazoamino compound is precipitated in one hour by addition of alcohol. The product thus obtained is centrifuged washed by absolute alcohol and dried under vacuum at 50° C.

The equation is as follows:

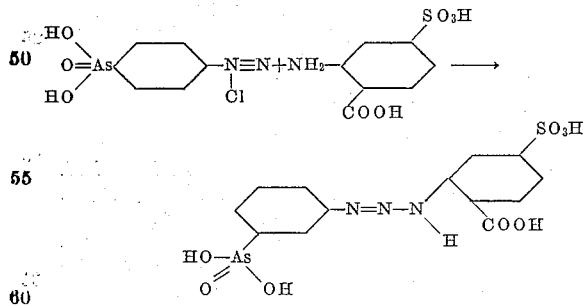

The same product can be obtained by condensing diazotized 2-amino-4-sulfobenzoic acid with m.-amino-phenyl-arsonic acid to a diazo-amino-compound.

*Example 3*

2.17 gr. p-amino-phenyl-arsonic acid are diazotized as described and the diazonium solution is poured under stirring at 5° C. in an aqueous solution containing 2.81 gr. anilin-disulfonic acid- (2.5), 1 gr. calcined sodium carbonate and 2 gr. sodium acetate. After two or three hours of stirring the mixture is neutralized by addition of sodium bicarbonate, after two other hours of stirring the solution is evaporated at 40–50° C. to dryness. The compound thus obtained is easily soluble and contains with a quantitative yield the sodium salt of the 2.5-disulfonic-diazo-amino-benzene-4'-arsonic acid.

The equation is as follows:

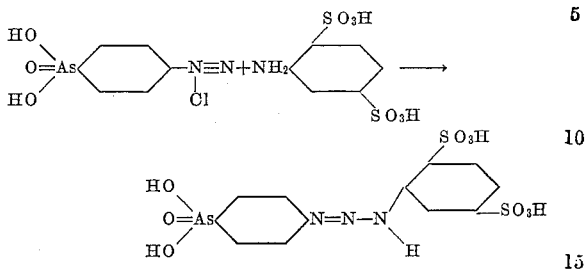

What we claim is:

1. Process for the manufacture of diazo-amino compounds by diazotizing an amine and condensing the product obtained in a medium which must not be strongly acid with another amine which does not contain a phenolic OH group, the one amine being an aniline arsonic acid and the other amine being a member of the group consisting of primary and secondary amines containing at least one sulfonic acid group.

2. Process for the manufacture of diazo-amino compounds by diazotizing an amine and condensing the product obtained in a medium which must not be strongly acid with another amine which does not contain a phenolic OH group, the one amine being an aniline arsonic acid and the other amine being a primary amine of the benzene series containing at least one sulfonic group.

3. Process for the manufacture of diazo-amino compounds by diazotizing an amine and condensing the product obtained in a medium which must not be strongly acid with another amine which does not contain a phenolic OH group, the one amine being an aniline arsonic acid and the other amine being a secondary amine of the benzene series containing at least one sulfonic group.

4. Process for the manufacture of diazo-amino compounds by diazotizing an aminophenylarsonic acid and condensing the product obtained in a medium which must not be strongly acid with aromatic amines of the general formula

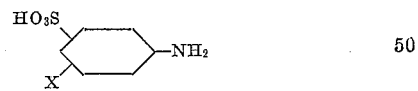

in which X is a member of the group consisting of hydrogen, COOH and $SO_3H$.

5. Process for the manufacture of diazo-amino compounds by condensing an aminophenylarsonic acid with diazotized aromatic amines of the general formula:

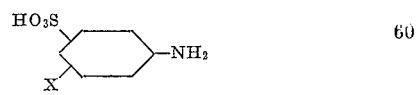

in which X is a member of the group consisting of hydrogen, COOH and $SO_3H$.

6. The products of the general formula

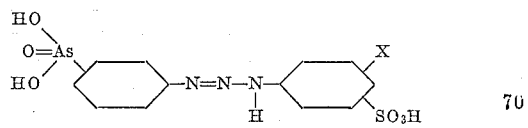

in which X stands for a member of the group consisting of hydrogen, COOH and $SO_3H$.

HANS EDUARD FIERZ-DAVID.
WILLY GERHARD STOLL.